UNITED STATES PATENT OFFICE.

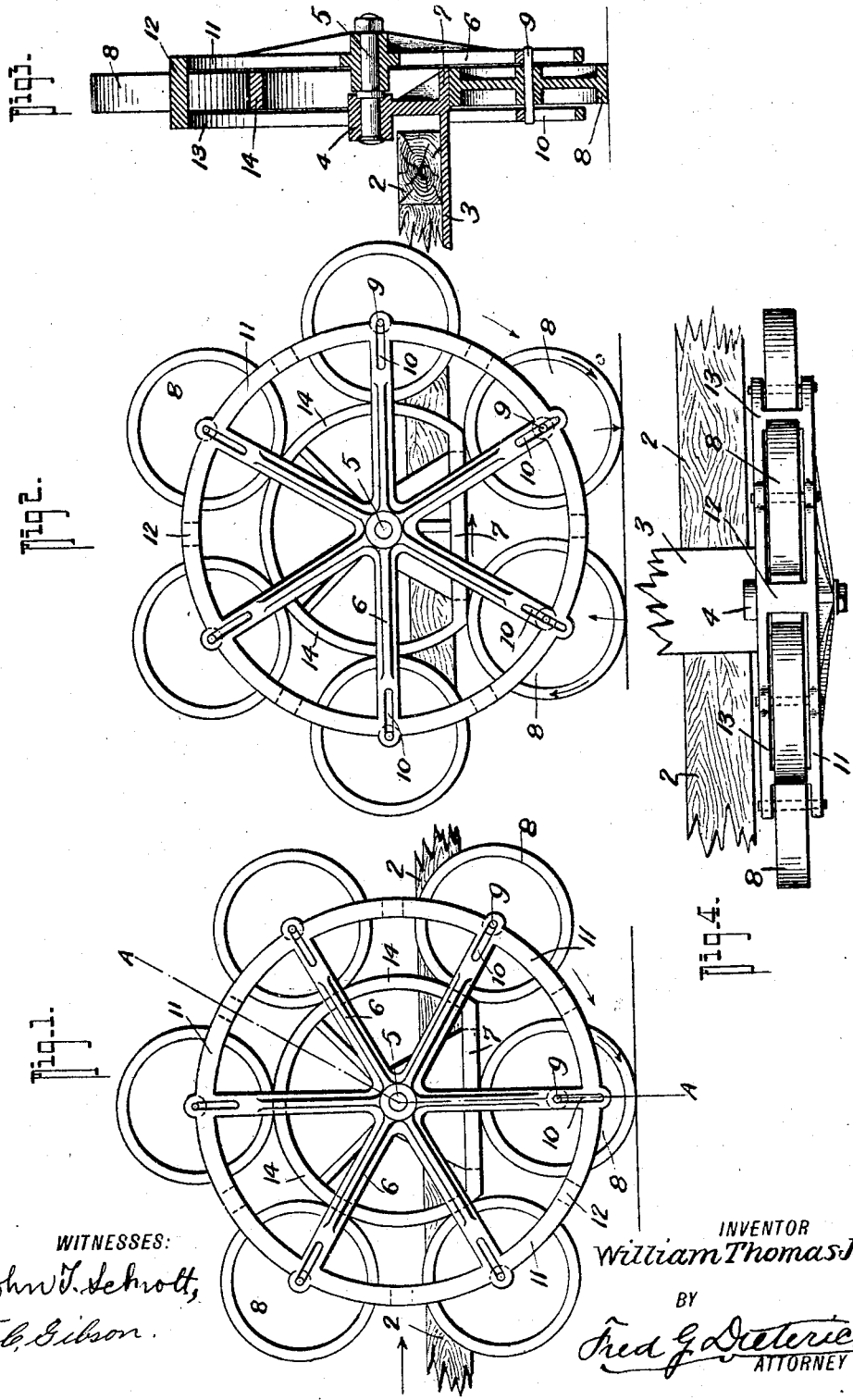

WILLIAM THOS. JONES, OF NEW WESTMINSTER, CANADA.

VEHICLE-WHEEL.

No. 795,620.           Specification of Letters Patent.           Patented July 25, 1905.

Application filed November 14, 1904. Serial No. 232,648.

*To all whom it may concern:*

Be it known that I, WILLIAM THOS. JONES, a citizen of the Dominion of Canada, residing at New Westminster, in the Province of British Columbia, Canada, have invented new and useful Improvements in Vehicle-Wheels, of which the following is a specification.

My invention relates to an improved vehicle-wheel particularly designed to lighten the draft of heavy road-vehicles, although the principle of its construction is adaptable for vehicle-wheels of any kind.

In the wheel which is the subject of this application the effort has been to obtain the introduction of an endless series of roller-wheels directly between the ground and the vehicle-frame, and I carry such roller-wheels in an open spider-wheel frame rotatably mounted on the vehicle-frame so that the roller-wheels will successively come into action during that portion of rotation of the spider-frame which brings the roller-wheels onto the road-level and allows the vehicle to roll forward on them.

The particular manner in which the device is constructed to bring this principle into practical application is fully described in the following specification and illustrated in the drawings which accompany it.

Figures 1 and 2 are side elevations of the wheel, showing it in two positions of its progressive movement. Fig. 3 is a cross-section on the line A A in Fig. 1, showing the structure of the roller-carrying spider-wheel and the bearing of the rollers under the vehicle-frame; and Fig. 4, a plan of the wheel in the position of Fig. 2.

In the drawings, 2 represents a portion of the vehicle-frame to which is secured a member 3, which may also be a part of the structure of the frame of the vehicle and is provided with a boss 4, in which an axle 5 is secured, on which is rotatably mounted a spider-wheel frame to carry the rollers. A portion 7 of this member 3 projects laterally outward from the vehicle-frame and extends lengthwise an equal distance on each side of a vertical line through the axis of rotation of the spider-wheel and in the plane of its rotation, and this portion 7 forms a tread or surface between which and the road-level the roller-wheels 8, which are to directly sustain the weight of the vehicle, are designed to roll. These roller-wheels 8 are each provided with short axles 9, projecting from each side, and by means of them the rollers are mounted in elongated radial slots 10 at equal intervals apart toward the outer circumference of the spider-wheel. This spider-wheel frame consists of a series of spokes 6 radiating from its hub and connected together toward their outer ends by a ring 11. Between adjacent roller-wheels distance-pieces 12 connect and support an inner ring 13, provided with elongated radial slots to correspond with those on the outer side of the wheel to sustain the axles of the roller-wheels on the inner side.

The structure so far described constitutes the simple elements of the wheel, the operation of which is as follows: As each roller-wheel 8 of the series carried by the spider-frame successively reaches the ground-level during the rotation of the wheel as a whole it enters the space between the tread 7, secured to the vehicle-frame, and the ground-level and will roll throughout the length of such tread, the length of which is so proportioned to the diameter and pitch of the roller-wheels that as one roller reaches the end of the track 7 the next one enters at the other end and receives the load, while the one in advance is lifted off the ground and is carried round by the spider-wheel.

To prevent the axles of the roller-wheels from dropping to the inner limit of the elongated slots which maintain them in position, the ends of the roller-tread 7 are connected to a track 14, the periphery of which is concentric with the axle, and the roller-wheels will roll round this track 14 as they successively come from under the tread 7.

It will be obvious that the proportion of the weight of the vehicle which is allotted to each complete wheel of it is sustained on the roller wheel or wheels which may be in action under the roller-tread 7, which forms a part of the vehicle-frame, the office of the spider-wheel being merely to carry the roller-wheels round and maintain them at their proper distance apart that they may successively at properly-spaced intervals enter under the tread 7 to act as rollers to support and carry forward the load.

With wheels of this construction a vehicle is moved forward on rollers instead of being sustained by wheels and axles; but there is a further and important advantage in the operation of the device which consists in the fact that intervals of the road equal to the pitch between the rollers are passed over by the wheel without any contact of the rollers. This may be seen by a reference to Fig. 2 of the drawings, which shows one roller-wheel on the right-hand side when moving to the right as having just entered on its work under the tread, while the other on the left has completed its movement, the tread having rolled on it its whole length and it is about to be lifted from the track. The path of a wheel made in accordance with my instructions will therefore consist of a series of short tracks each equal to the length of the roller-tread 7 on the vehicle-frame, alternating with interspaces over which the wheel as a whole has stepped forward an equal amount to what has been rolled over. The step forward is equal to the amount traveled by each roller, because the length of the roller-tread will require to be made equal to the pitch of the rollers in the spider-frame when such rollers are on the track A complete wheel having, say, six roller-wheels of twelve inches in diameter and pitched, say, fourteen inches apart will travel in performing one revolution of the complete wheel a distance equal to twelve times the pitch of the roller-wheels, or fourteen feet, while the ground rolled over will be only seven feet. This must result in a considerable saving in the draft required; but there is a further advantage that where the wheel is used as a driving-wheel, which may conveniently be done by gearing the driving-pinion to the inner ring 13 of the spider-wheel, if the rollers 8 sink in soft ground they will not work themselves into the road, as the next roller as it comes round will engage the road-level well away from the bed of the roller which has sunk.

Having now particularly described the nature of my invention, what I claim as new, and desire to be protected in by Letters Patent, is—

1. As a means for sustaining and moving a vehicle along a road or track; a plane roller-surface on the vehicle extending lengthwise in the intended line of movement, and means for introducing an endless series of rollers directly between the roller-surface on the vehicle and the track said means including a spider-frame, and rollers radially mounted thereon.

2. In a device of the class described; a roller-surface on the vehicle, the plane of which surface is parallel to that of the track and extends lengthwise in the line of movement of the vehicle, and means for introducing an endless series of rollers directly between the roller-surface on the vehicle and the track said means including a spider-frame, and rollers radially mounted thereon.

3. In a device of the class described, a plane roller-surface secured to and laterally projecting from the frame of a vehicle and extending lengthwise in the desired line of movement parallel to the plane of the road-surface, and means for introducing an endless series of rollers directly between the roller-surface on the vehicle and the track said means including a spider-frame, and rollers radially mounted thereon.

4. In a wheel of the class described; the combination with a roller-surface on the vehicle, of a wheel-frame comprising a rim and a plurality of radial spokes formed therewith, said frame being rotatable on an axis on the vehicle adjacent to the roller-surface, said wheel-frame carrying a series of rollers having axles and said rollers being mounted with their axles in radially-elongated slots in the spokes of the wheel-frame, so that they will successively, as the vehicle moves, be introduced between the roller-surface and the track.

5. As a vehicle-wheel; the combination with a roller-surface on the vehicle, of a rotatable wheel spider-frame the axis of rotation of which is on the vehicle-frame and situated in a perpendicular line through the middle of the length of the roller-surface, said frame carrying a series of rollers having axles mounted in radially-elongated slots, the inner ends of which are at distances from one another approximately equal to the length of the roller-surface and equidistant from the center of the wheel.

6. As a vehicle-wheel; the combination with a roller-surface on the vehicle of a wheel-frame rotatably mounted on the vehicle-frame, the axis of rotation being in a vertical line through the center of the length of the roller-surface, said wheel-frame having toward its extreme diameter an outer and an inner ring secured together with a space between, a series of radially-elongated slots corresponding in each ring, said slots being equidistant from the center of rotation of the wheel-frame and from one another, and the inner ends of these slots pitched apart an amount approximately equal to the length of the roller-surface, and a series of roller-wheels provided with outwardly-projecting axles by which the wheels may be mounted in the slots of the rings of the wheel-frame.

7. In a device of the class described; the combination with a wheel-frame rotatably mounted on the frame of the vehicle, such wheel-frame carrying a series of rollers axially mounted toward the circumference thereof, of a roller-surface secured to the vehicle-frame and laterally projecting toward the wheel-frame within the circle limited by the inner sides of the roller circumferences and extending therein parallel to the road-surface a distance equal to the pitch of such rollers, and means for allowing the rollers to move radially toward the center of the wheel as they pass under the roller-surface.

8. In a device of the class described; the combination with a roller-surface secured to the vehicle-frame, of a wheel-frame rotatable round such surface, such wheel-frame comprising an inner and outer ring connected by distance-pieces so that the rings will be parallel to one another with a space between, radially-elongated slots corresponding with one another in each ring, which slots are at equal distances from the center of the wheel and the pitch of the inner ends of such slots being approximately equal to the length of the roller-surface before referred to, a series of roller-wheels having outwardly-projecting axles by means of which the rollers are mounted in the radial slots and between the rings of the wheel-frame, and a guard connected to the ends of the roller-surface which guard above the roller-surface is concentric with the axle-wheel and is designed to maintain the roller-wheels at the outer limit of their movement in the radial slots when the roller-wheels are not in contact with the roller-surface or the track.

9. In a device of the class described; the combination with the roller-surface 7 secured to the frame of the vehicle, of a wheel-frame rotatable round such surface, such wheel-frame comprising, the spokes 6, inner and outer rings 11 and 13 secured together by distance-pieces 12, radially-elongated slots 10 in which are mounted the roller-wheels 8, and the guard 14 secured to and forming an upward continuation of the roller-surface 7 concentric with the axle of the wheel.

In testimony whereof I have signed my name to this specification in the presence of two subscribing witnesses.

WILLIAM THOS. JONES.

Witnesses:
ROWLAND BRITTAIN,
ELLICE WEBBER.